United States Patent
Dhatt et al.

(10) Patent No.: US 10,621,652 B2
(45) Date of Patent: Apr. 14, 2020

(54) SYSTEM AND METHOD FOR ONLINE SHOPPING

(71) Applicant: BorderFree, Inc., New York, NY (US)

(72) Inventors: Brian Dhatt, New York, NY (US); Amir-Reza Dorafshar, New York, NY (US); Kris Green, Toronto (CA)

(73) Assignee: Borderfree, Inc., New York, NY (US)

( * ) Notice: Subject to any disclaimer, the term of this patent is extended or adjusted under 35 U.S.C. 154(b) by 376 days.

(21) Appl. No.: 15/488,857

(22) Filed: Apr. 17, 2017

(65) Prior Publication Data

US 2017/0221138 A1 Aug. 3, 2017

Related U.S. Application Data

(63) Continuation of application No. 14/137,149, filed on Dec. 20, 2013, now abandoned.

(51) Int. Cl.
*G06Q 30/06* (2012.01)
*G06F 16/9537* (2019.01)
*G06F 40/42* (2020.01)
*G06Q 20/12* (2012.01)

(52) U.S. Cl.
CPC ..... *G06Q 30/0641* (2013.01); *G06F 16/9537* (2019.01); *G06F 40/42* (2020.01); *G06Q 20/12* (2013.01); *G06Q 30/0601* (2013.01); *G06Q 30/0613* (2013.01); *G06Q 30/0621* (2013.01)

(58) Field of Classification Search
CPC ................................................. G06Q 30/06–08

USPC .................................................. 705/26.1–27.2
See application file for complete search history.

(56) References Cited

U.S. PATENT DOCUMENTS

| | | | |
|---|---|---|---|
| 2002/0046131 A1* | 4/2002 | Boone | G06Q 30/06 705/27.1 |
| 2002/0120527 A1 | 8/2002 | Lam | |
| 2005/0050548 A1 | 3/2005 | Sheinis | |
| 2008/0272045 A1 | 10/2008 | Le Roy | |
| 2011/0238484 A1 | 9/2011 | Toumayan | |
| 2012/0023160 A1 | 1/2012 | Marmor | |
| 2013/0185147 A1 | 7/2013 | Letca | |
| 2013/0324159 A1 | 12/2013 | Smalling | |
| 2013/0326023 A1 | 12/2013 | O'Mara | |

OTHER PUBLICATIONS

Display International Pricing the Right Way, Craig Vodnik, Mar. 3, 2011, available at: https://www.cleverbridge.com/corporate/display-international-pricing-the-right-way/ (Year: 2011).*
Beginner Geek: Everything You Need to Know About Browser Extensions, available at: https://www.howtogeek.com/169080/beginner-geek-everything-you-need-to-know-about-browser-extensions/, Chris Hoffman, Aug. 1, 2013 (hereafter (Year: 2013).*

* cited by examiner

*Primary Examiner* — Ming Shui
(74) *Attorney, Agent, or Firm* — Brian A. Lemm; Charles R. Malandra, Jr.

(57) ABSTRACT

A system of and method for online shopping in which an intelligent agent at a client-side server renders and updates domestic information relevant to a first geographical location provided on any deliverable Webpages such that the updated information is displayed on the display device as non-domestic information relevant to a second geographical location.

7 Claims, 8 Drawing Sheets

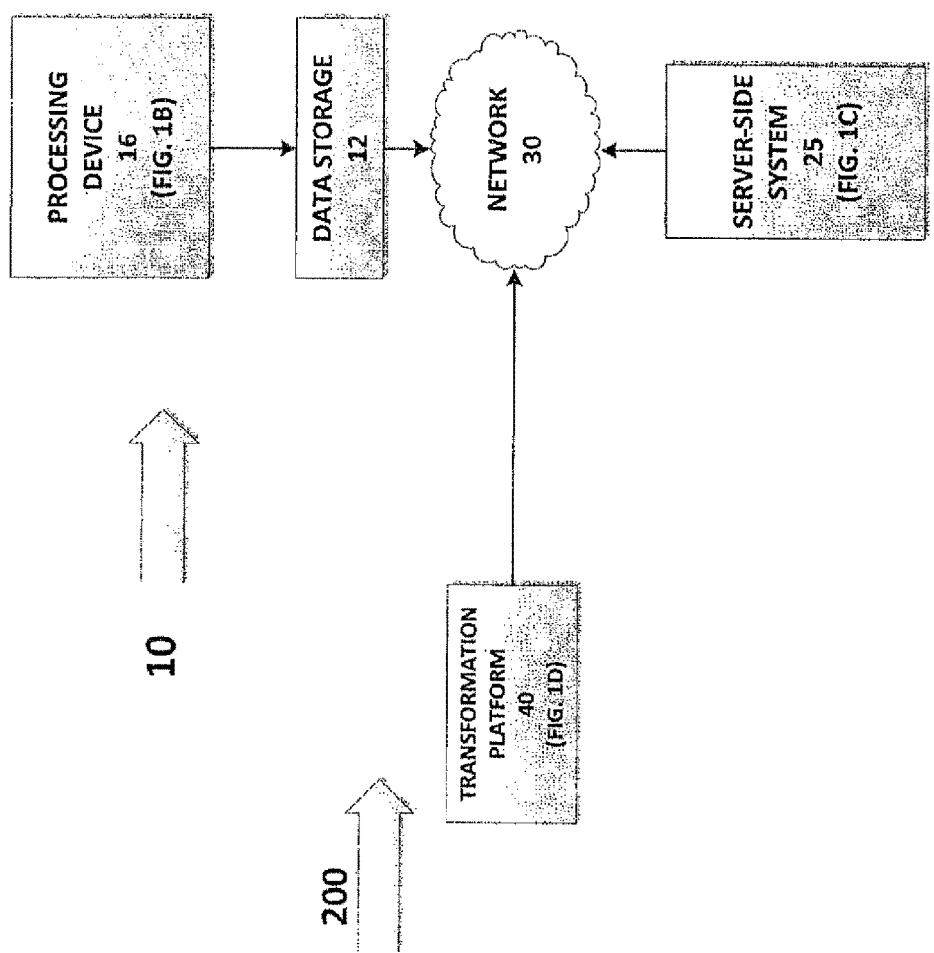

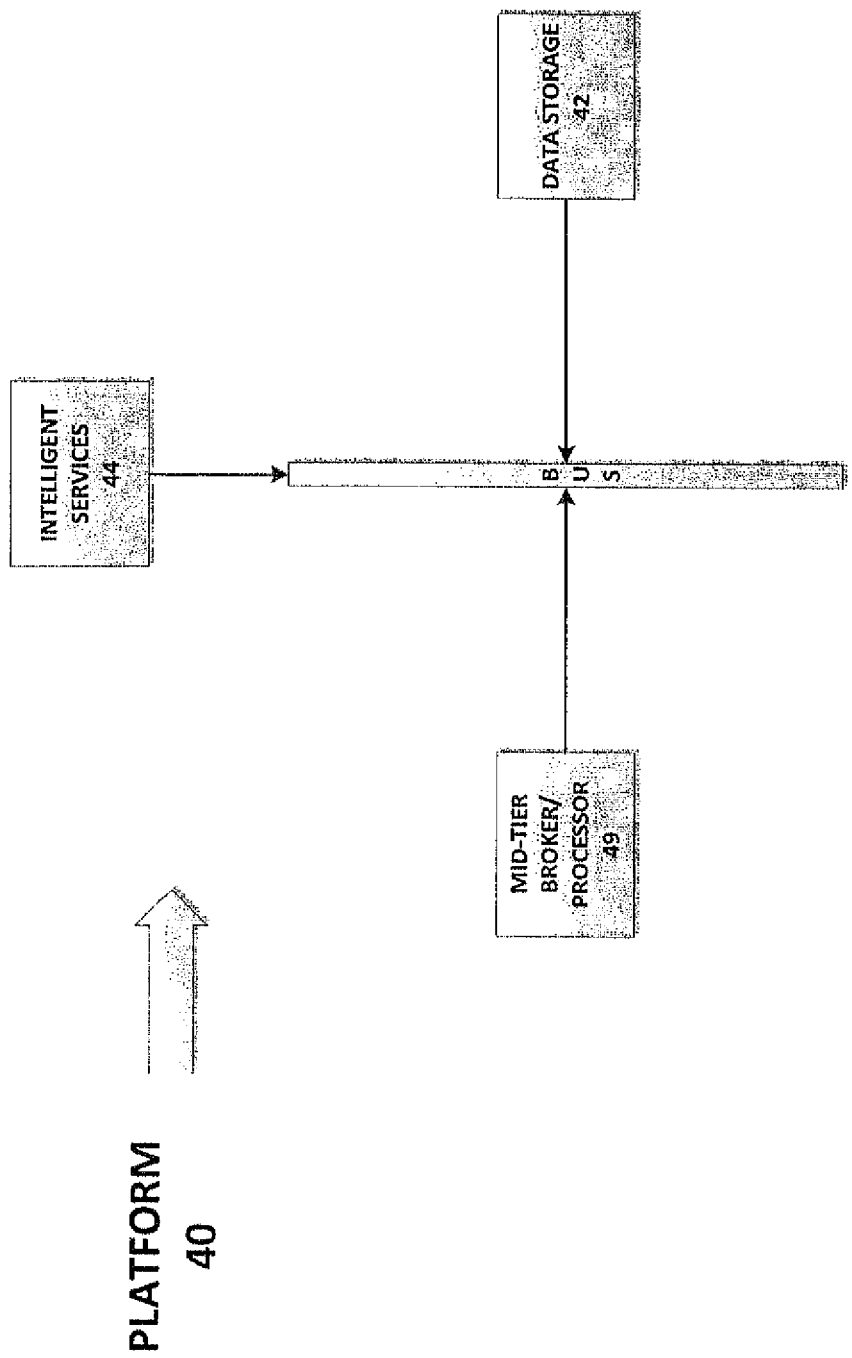

SYSTEM AND METHOD FOR ONLINE SHOPPING

CROSS REFERENCE TO RELATED APPLICATIONS

This application is a continuation application of prior application Ser. No. 14/137,419, filed Dec. 20, 3013, the contents of which is incorporated herein by reference.

FIELD OF THE INVENTION

The invention relates generally to methods and supporting systems for facilitating electronic commerce, and, more specifically, electronic commerce that requires specialized localization.

BACKGROUND OF THE INVENTION

Online shopping has become global in that vendor servers located in a first geographical area can be accessed by consumers located in a second geographical area that may not only be remote from the first geographical area but that may include different pricing and other cultural practices. As a result, in order to make the shopping experience more enjoyable for consumers and to enhance trans-border commerce, existing vendor servers require the party operating a Website to undertake custom coding, which is problematic.

Hence, it would be desirable to provide an online system that enhances trans-border commerce using a universal coding that may be used across multiple parties' Websites without requiring the party running a Website to have to perform active steps in the transformation, e.g., write or provide additional coding and/or execute the additional coding. It would be further desirable to provide an online system that uses a universal coding to change certain attributes of specific Websites and Webpages emanating from those Websites on a discretionary basis. Furthermore, it would be desirable to provide an online system that provides a universal coding that can be customized for use on a discrete party's Website, e.g., the Website of a mid-tier broker.

SUMMARY OF THE INVENTION

In a first aspect, the present invention includes a system for online shopping. In some embodiments, the system comprises a data storage device for storing information that includes computer-executable instructions for enabling online shopping; a mid-tier broker platform; and a processing device for executing the computer-executable instructions. In some variations of this embodiment, the processing device may include memory for storing information, e.g., a client-side library, a user browser, a display device, and an intelligent agent. Preferably, the user browser is adapted to enable the user to search for products and pricing information about the products offered by vendor servers that operate a Website having a vendor catalog and deliverable Webpages and, moreover, to detect additional coding incorporated into any of the plurality of deliverable Webpages. The intelligent agent may be adapted to render and update information relevant to a first geographical location provided on any of the plurality of deliverable Webpages such that the updated information is displayed on the display device as information relevant to a second geographical location. The information relevant to a discrete geographical area may include a default currency and/or a default shipping destination.

In other variations of the embodiment, the intelligent agent may be adapted to store data sent from a vendor's Website in the form of at least one of static cookies and volatile cookies and may be initialized by the web browser after the web browser has detected additional coding incorporated into any of the plurality of deliverable Webpages. Preferably, the additional coding does not require Website-specific coding.

In some variations of the embodiments, the system may include a context chooser, which may be adapted to allow the user to manually override the updated information before it is displayed on the display device as information relevant to the second geographical location.

In other variations, after being initialized by the user browser, the intelligent agent may be adapted to render on the display device a Webpage having information relevant to a first geographical location but that is displayed as information relevant to a second geographical location. For the purpose of illustration and not limitation, information relevant to the first geographical location and the information relevant to the second geographical location may be selected from the group consisting of: a price in a default billing currency, a price in a preferred billing currency, local taxes, additional duties, value added taxes, export codes, classification under the Harmonized Commodity Description and Coding System, shipping costs, handling costs, shipping restrictions, import restrictions, export restrictions, licensing requirements, geographical-specific discounts, and geographical-specific mark-ups.

In a second aspect, the present invention provides a method of transforming information relevant to a first geographical location found in any Webpage into information relevant to a second geographical location. In some embodiments, the method comprises providing a processing device for executing computer-executable instructions, the processing device including memory for storing information, a user browser that is adapted to enable the user to search for products and pricing information about the products offered by at least one vendor server, each vendor server adapted to run a Website having a vendor catalog and a plurality of deliverable Webpages, a display device, and an intelligent agent; detecting using the user browser additional coding incorporated into any of the plurality of deliverable Webpages; initializing the intelligent agent after detecting the additional coding; transforming using the intelligent agent information relevant to a first geographical location in any of the plurality of Webpages into information relevant to a second geographical location; and displaying on the display device a Webpage having information relevant to the first geographical location but that is displayed as information relevant to the second geographical location.

In some variations of the embodiment, the method further may comprise accessing using the intelligent agent a mid-tier broker having a database containing information relevant to a plurality of geographical locations. The information relevant to the first geographical location and the information relevant to the second geographical location may be selected from the group consisting of: a price in a default billing currency, a price in a preferred billing currency, local taxes, additional duties, value added taxes, export codes, classification under the Harmonized Commodity Description and Coding System, shipping costs, handling costs, shipping restrictions, import restrictions, export restrictions, licensing requirements, geographical-specific discounts, and geographical-specific mark-ups.

In a further embodiment, the method may include enabling a user to over-ride displaying the information relevant to the second geographical location. For example, the method may include substituting information relevant to a third geographical location for the over-ridden information relevant to the second geographical location.

DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A shows an illustrative embodiment of a distributed processing system for online shopping in accordance with the present invention;

FIG. 1D shows an illustrative embodiment of the mid-tier broker platform of FIG. 1A in accordance with the present invention;

DETAILED DESCRIPTION OF THE INVENTION

Figure 1B:
FIG. 1B shows an illustrative embodiment of the client-side processing device of FIG. 1A in accordance with the present invention.
Figure 1B:
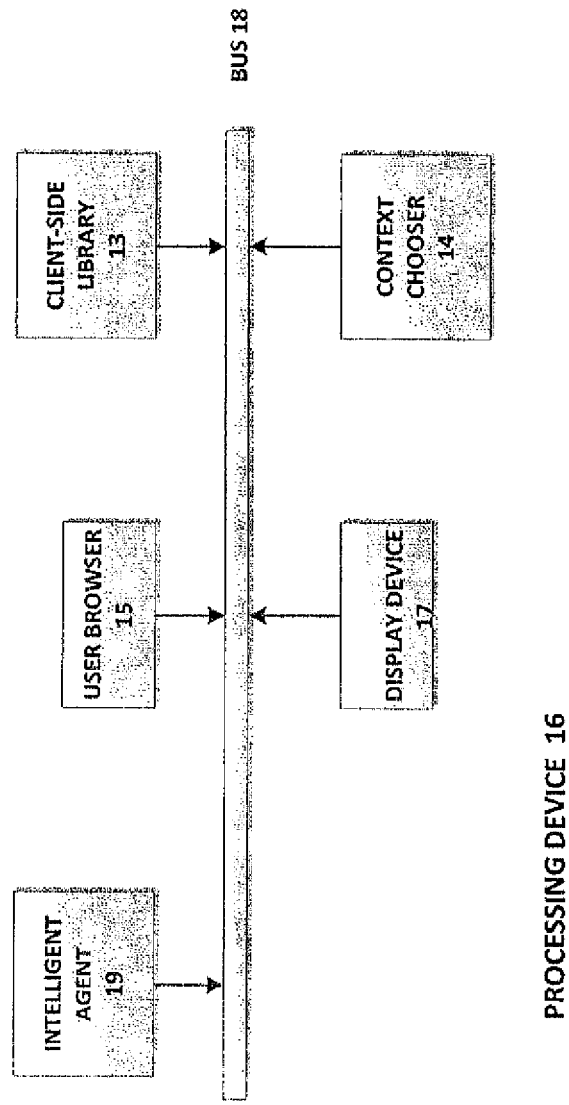

FIG. 1A shows a block diagram of a distributed computer system 200, in which various aspects and functions in accord with the present invention may be practiced. In some embodiments, the embodied distributed computer system 200 may include a client-side, online shopping system 10, a server-side processing system 25, and a mid-tier broker platform 40. Although FIG. 1A only shows a single client-side, online shopping system 10 and a single server-side processing system 25, the embodied distributed computer system 200 may include multiple client-side, online shopping systems 10 and multiple server-side computer systems 25.

In some variations of the embodiment, the computer systems 10, 25 and mid-tier broker platform 40 may be interconnected by and may exchange data through a communication network 30. Network 30 may include any communication network through which computer systems 10, 25 may exchange data, e.g., the Internet, a local area network (LAN), a wide area network (WAN), and so forth. For example, to exchange data using the communication network 30, computer systems 10, 25 and mid-tier broker platform 40 may use various methods, protocols and standards, including, among others: token ring, Ethernet, Bluetooth, TCP/IP, UDP, HTTP, FTP, SNMP, SMS, MMS, SS7, JSON, Soap, and Corba. To ensure data transfer is secure, computer systems 10, 25 and mid-tier broker platform 40 may transmit data via network 30 using a variety of security measures including, for example, TSL, SSL or VPN among other security techniques. While distributed computer system 200 illustrates three networked computer systems, distributed computer system 200 may include any number of computer systems and computing devices, networked using any medium and communication protocol.

The Client-Side Processing System

Various aspects and functions described herein may be implemented as hardware or software on one or more computer systems 10. There are many examples of computer systems in use currently including network appliances, personal computers, workstations, mainframes, networked clients, servers, media servers, application servers, database servers and web servers. Other examples of computer systems may include mobile computing devices, such as cellular phones, personal digital assistants, and network equipment, such as load balancers, routers and switches. Further, aspects in accord with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements, and components using a variety of hardware and software configurations, and the invention is not limited to any particular distributed architecture, network or communication protocol.

As depicted in FIG. 1A, in some embodiments, the client-side, online shopping system 10 may include a data storage device 12 and a processing device 16. The data storage system 12 may include a computer readable and writeable nonvolatile storage medium in which instructions are stored that define a program to be executed by the processing device 16. More specifically, in some variations, the data storage device 12 may be adapted to store information that includes computer-executable instructions for enabling online shopping. Data storage system 12 may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 13 that allows for faster access to the information by the processor than does the storage medium included in data storage system 12. The memory may be located in data storage system 12 or in memory 13, however, processing device 16 may manipulate the data within the memory 13, and then copy the data to the medium associated with data storage system 12 after processing is completed. A variety of components may manage data movement between the medium and integrated circuit memory element and the invention is not limited thereto. Further, the invention is not limited to a particular memory system or storage system.

The processing device 16 may be structured and arranged to perform a series of instructions that result in manipulated data. For that purpose, the processing device 16 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available.

More particularly, the processing system 10 may comprise a computer system including an operating system that manages at least a portion of the hardware elements included in the processing system 10. Usually, a processor or controller, such as processing device 16, executes an operating system which may be, for example, a Windows-based operating system (e.g., Windows NT, Windows 2000 (Windows ME), Windows XP operating systems, available from the Microsoft Corporation), a MAC OS System X operating system available from Apple Computer, one of many Linux-based operating system distributions (e.g., the Enterprise Linux operating system available from Red Hat Inc.), a Solaris operating system available from Sun Microsystems, or a UNIX operating systems available from various sources. Many other operating systems may be used, and embodiments are not limited to any particular implementation.

The processing device 16 and operating system together define a computer platform for which application programs in high-level programming languages may be written. These component applications may be executable, intermediate, e.g., C+, or interpreted code which communicate over a communication network, e.g., the Internet, using a communication protocol, e.g., TCP/IP. Similarly, aspects in accord with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used.

Additionally, various aspects and functions in accord with the present invention may be implemented in a non-programmed environment, e.g., documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a Webpage may be implemented using HTML while a data object called from within the Webpage may be written in C++. Thus, the invention is not limited to a specific programming language and any suitable programming language could also be used.

A processing system 10 included within an embodiment may perform functions outside the scope of the invention. For instance, aspects of the system may be implemented using an existing commercial product, such as, for example, Database Management Systems such as SQL Server available from Microsoft of Seattle, Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Although processing system 10 is shown by way of example as one type of computer system upon which various aspects and functions in accord with the present invention may be practiced, aspects of the invention are not limited to being implemented on the computer system as shown in FIG. 1B. Various aspects and functions in accord with the present invention may be practiced on one or more computers having a different architectures or components than that shown in FIG. 1B. For instance, processing system 10 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

As shown in FIG. 1B, in one variation of the embodiment, the client-side, processing device 16 may comprise memory 13, a context chooser 14, a user interface 15 (e.g., a browser), a display device 17, and an intelligent agent 19. The components of the processing device 16 may be coupled by an interconnection element such as a bus 18. The bus 18 may include one or more physical busses, e.g., between components that are integrated within a same machine, but may include any communication coupling between system elements including specialized or standard computing bus technologies such as IDE, SCSI, PC1 and InfiniBand. The bus 18 may further connect the processing device 16 to other system 200 elements, e.g., the communication network 30, mid-tier broker platform 40, etc. Thus, the bus 18 enables communications, e.g., of data and instructions, to be exchanged between elements of the processing system 10 as well as between components of the overall system 200.

Processing device memory, e.g., a client-side library 13, may be used for storing programs and data during operation of processing device 16. Memory 13 may include any device for storing data, such as a disk drive or other non-volatile storage device. For example, memory 13 may be a relatively high performance, volatile, random access memory (RAM) such as a dynamic random access memory (DRAM) or static memory (SRAM). Various embodiments in accord with the present invention may organize memory 13 into particularized and, in some cases, unique structures to perform the aspects and functions disclosed herein.

The processing device 16 also includes one or more interface devices 15 such as input devices (e.g., a browser), output devices 17, and combination input/output devices. Interface devices 15 enable processing devices 16 to exchange information and to communicate with external entities, such as users 11 and other systems 25, 40. Advantageously, interface devices 15 are configured to receive input or to provide output with both internal and external sources. Examples of interface devices 15 include keyboards, mouse devices, trackballs, microphones, touch screens, printing devices, display screens, speakers, network interface cards, etc.

In one embodiment, the interface device may be a user interface such as a Web browser 15 that may be adapted to enable the user 11 to search for product and pricing information offered by vendor servers 20 operating a Website 21 and having a vendor catalog 23 consisting of deliverable Webpages 22. Advantageously, as will be discussed in greater detail below, the Web browser 15 may be structured and arranged to search for and to recognize a special coding that may be included in a deliverable Webpage(s) 22 and, moreover, to initialize the intelligent agent 19 once the special coding is detected.

The context chooser 14 and intelligent agent 19 may be implemented as hardware or software or a combination thereof. The function of the context chooser 14 and intelligent agent 19 and their interplay between the other elements of the client-side, processing system 10 will be described in greater detail in the discussions on the transformation process that follow. Advantageously, the intelligent agent 19 may be configured to interact with and process data from the mid-tier broker platform 40 as well as data stored in the client-side library 13 to affect transaction-related information that is rendered and displayed on the display device 17 in connection with a product in a delivered Webpage 22. The context chooser 14 may be adapted to enable a user 11 to tailor the transaction-related information that is rendered and displayed on the display device 17.

Figure 1C:
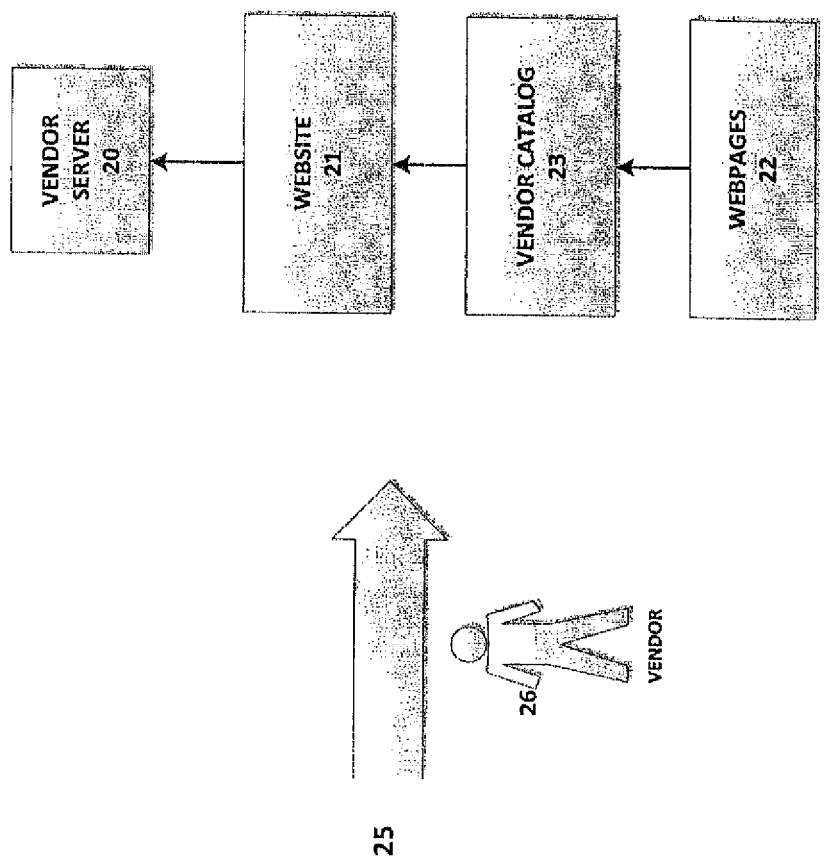
FIG. 1C shows an illustrative embodiment of the server-side processing device of FIG. 1A in accordance with the present invention.

Server-Side (Vendor) Processing System and the Universal, Non-Website-Specific Coding Although FIG. 1C only shows a server-side processing system 25 having a single merchant or vendor 26 and a single vendor server 20, the invention is not to be construed as being limited to one of each. On the contrary, in some embodiments of the present invention, on the server-side 25 of the overall system 200, there are multiple vendors 26, each having at least one vendor server 20, one or more vendor catalogs 23, each having a plurality of coded Webpages 22. Accordingly, in the descriptions that follow, when a single vendor 26 or a single vendor server 20 is described, the description may be construed to include plural vendors 26 and plural vendor servers 20.

As with the client-side processing system 10 previously described, various aspects and functions described herein may be implemented as hardware or software on one or more server-side processing systems 25. As described in greater detail above, there are many examples of computer systems in use currently including network appliances, personal computers, workstations, mainframes, networked clients, servers, media servers, application servers, database servers and web servers. Other examples of computer systems may include mobile computing devices, such as cellular phones, personal digital assistants, and network equipment, such as load balancers, routers and switches. Further, aspects in accord with the present invention may be located on a single computer system or may be distributed among a plurality of computer systems connected to one or more communications networks.

As is well-known to those of ordinary skill in the art, in some applications, a vendor server 20 may be used to run or operate one or more Websites 21, and, moreover, may be adapted to deliver to a requesting user 11 one or more Webpages 22 from a vendor catalog 23. Typically, a certain portion(s) of the deliverable Webpage(s) 22, may contain product and pricing information. To promote rapid and easy deployment, in some embodiments, at the vendor side 25, some portion(s) of a requested, deliverable Webpage 22 may be written without Website-specific, e.g., HTML, coding. For example, vendors 26 may manually include a Javascript line to some portion(s) of each of the vendor's Webpages 22. The absence of Website-specific coding in certain portions of the Webpage 22 is one of the keys to the present invention. Indeed, a non-Website-specific, universal or substantially universal coding can, instead, be included in a portion(s) of the Webpage 22. As a result, with application of the universal or substantially universal coding, the Websites 21 and/or the vendor servers 20 themselves are not required to transform data contained in the specially-coded portion(s) of the Webpage(s) 22.

Figure 2A:
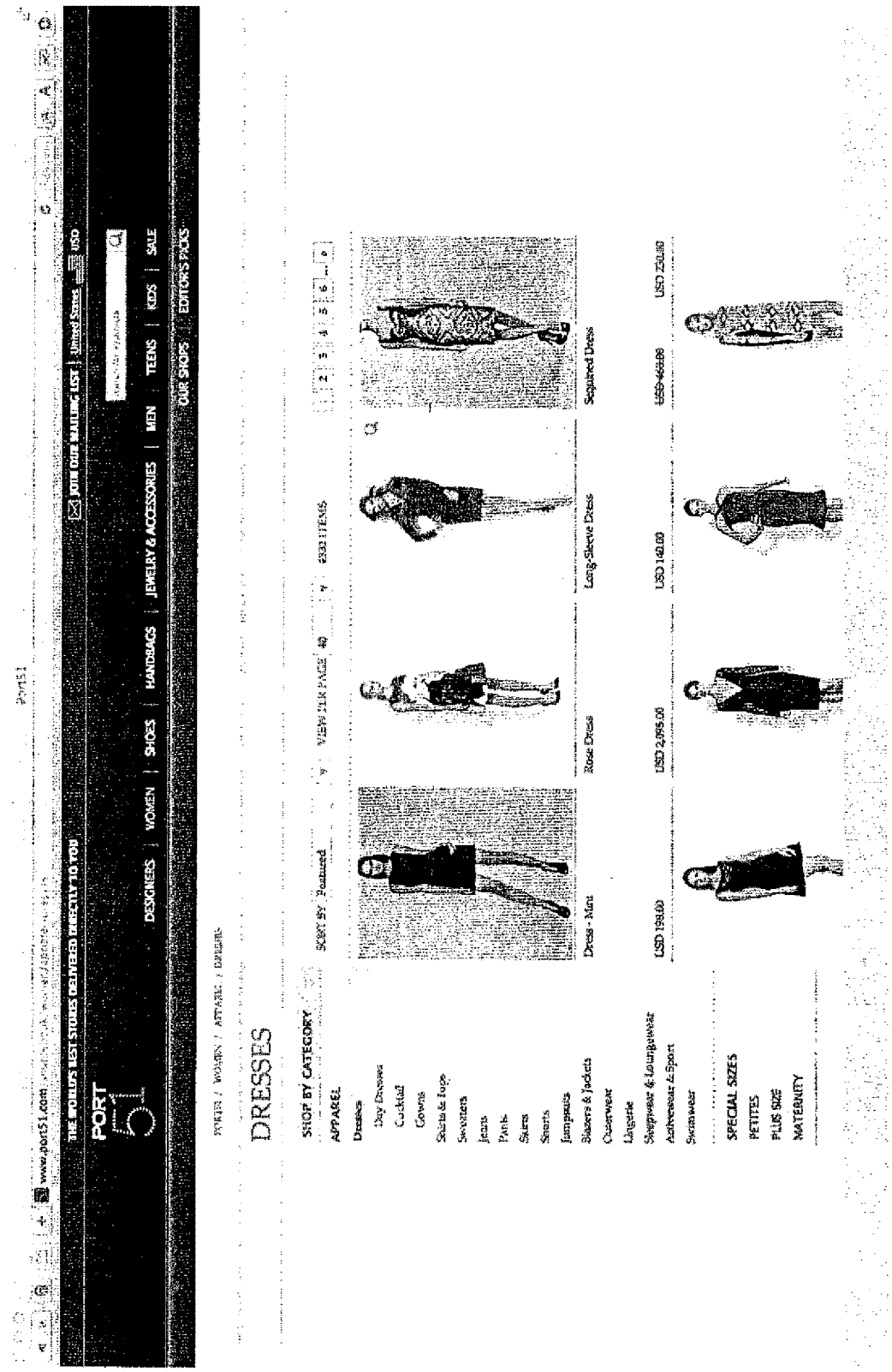
FIGS. 2A and 2B show illustrative images of a displayed Webpage in which pricing is shown, respectively, in U.S. dollars and Canadian dollars in accordance with the present invention.

According to one aspect of the present invention, the universal coding may be configured to cause a requesting user's software (Web) browser 15 and the intelligent agent 19 to render certain product and pricing information contained in a certain portion(s) the deliverable Webpages 22 in a desired manner. More particularly, the software browser 15 and/or intelligent agent 19 may, before displaying the requested Webpage 22 on a display device 17, transform certain "domestic" pricing and product information portions of the Webpages 22 into "non-domestic" pricing and product information portions. For example, according to such a transformation, referring to FIG. 2A, a U.S. vendor server 20 may operate a Website 21 and/or transmit requested, deliverable Webpages 22 that contain pricing and product information e.g., in U.S. dollars, that are unique to or more common in a first geographical area, e.g., the U.S. Referring to FIG. 2B, by operation of some embodiments of the present invention, a requesting user 11 in a second geographical area, e.g., Canada, may receive requested Webpages 22 from the Website 21 operated by the vendor server 20 that, after transformation, contain pricing and product information, e.g., in Canadian dollars, that are unique to or more common in the second geographical area, e.g., Canada, of the requesting user 11. The pricing and product information corresponding to the first geographical area, e.g., the U.S., may be referred to as some of the "domestic" portions of the deliverable Webpage 22. Whereas the transformed pricing and product information corresponding to the second geographical area, e.g., Canada, may be referred to as some of the "non-domestic" portions of the delivered Webpage 22.

In short, the universal coding of the present invention may be adapted to enable such a transformation in the presentation of pricing and product information from the first geographical area to the second geographical area, which is to say a transformation from "domestic" pricing and product information to "non-domestic" pricing and product information. The use of the adjectives "domestic" and "non-domestic" connotes that the information is "domestic" at the server-side and "non-domestic" at the client-side of the transaction. Advantageously, the invention may further include an override capability described in greater detail below that would allow a user 11 on the client-side to prefer displaying pricing and product information in accordance with pricing and local custom and practice in a user-designated third geographical area.

Mid-Tier Broker Platform

Referring to FIG. 1D, an exemplary mid-tier broker platform 40 is shown. In some embodiments, the mid-tier broker platform 40 includes a data storage system 42, an intelligent services device 44, and a processing device, i.e., the mid-tier broker 49. The data storage system 42 may include a computer readable and writeable nonvolatile storage medium in which instructions are stored that define a program to be executed by the processing device 49. More specifically, in some variations, the data storage system 42 may be adapted to store information that includes computer-executable instructions for enabling online shopping. Data storage system 42 may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor 49 or some other controller may cause data to be read from the nonvolatile recording medium into another memory that allows for faster access to the information by the processor 49 than does the storage medium included in data storage system 42. The memory may be located in data storage system 42, however, the processing device 49 may manipulate the data within another memory, and then copy the data to the medium associated with data storage system 42 after processing is completed. A variety of components may manage data movement between the medium and integrated circuit memory element and the invention is not limited thereto. Further, the invention is not limited to a particular memory system or data storage system.

The intelligent services device 44 may include at least one library containing transaction data that can include, without limitation: merchant identification and geographical location information, user IP addresses and geographical location (shipping) information, countries to which delivery is supported (in general and by each merchant), all possible transaction currencies, current currency exchange and transaction rates, shipping (export and import) restrictions (by country and by each merchant), pricing customization rules, commercial rules (by geographical location), and the like. Data from the at least one back-end library and intelligent services device 44 may be used to populate the pricing and product information portion(s) on a requested, deliverable Webpage(s) 22 before the Webpage(s) 22 is rendered and displayed on a display device 17.

Use of these data addresses the following: for example, in a first geographical area, a product and corresponding pricing and product information embedded into or included on a deliverable Webpage 22 may include "domestic" portions such as a default pricing in a local, i.e., "domestic," currency, e.g., British Pounds, Euros, Japanese Yen, and so forth. These "domestic" portions also may include product size information in accordance with local, i.e., "domestic," custom or practice, e.g., lengths in millimeters, weight in kilograms, volume in liters, and so forth. Such custom or practice may further take into account presenting prices with or without taxes included, whichever is commonly practiced "domestically." Without the "domestic-to-non-domestic" transformation, a user 11 in a second geographical area may be less inclined to purchase products from the vendor 26. Indeed, users 11 would rather shop using the user's preferred or default currency, e.g., U.S. dollars, and would rather receive product size information in inches, in pounds, in ounces, and so forth. Furthermore, users 11 likely prefer to receive pricing information in accordance with their "non-domestic," local or regional customs or practice, e.g., prices include or do not include local taxes in the offer price. The system 200 and mid-tier transformation platform 40, however, facilitates such a transaction.

As with the client-side 10 and server-side processing systems 25 previously described, various aspects and functions of the mid-tier broker platform 40 described herein may be implemented as hardware or software on one or more processing systems 49. As described in greater detail above, there are many examples of computer systems in use currently including network appliances, personal computers, workstations, mainframes, networked clients, servers, media servers, application servers, database servers and web servers. Other examples of computer systems may include mobile computing devices, such as cellular phones, personal digital assistants, and network equipment, such as load balancers, routers and switches. Further, aspects in accord with the present invention may be located on a single computer system or may be distributed among a plurality of computer systems connected to one or more communications networks.

Method of Transforming Pricing and Product Information

The operation and inter-functioning of the components of the online shopping system 200 and of the elements of the components 10, 25, 40 will now be described. For illustrative purposes only, the operation and inter-functioning will be described in the context of modifying certain information portions of a delivered Webpage 22 prior to display, e.g., transforming price and product information contained in or on a Webpage 22 generated from a first geographical area but displayed in a second geographical area. Although the following description addresses transforming price and product information from a first geographical area to a second geographical area, using the disclosed teachings, one of ordinary skill in the art may be able to apply the system of the present invention and the teaching of the method to a myriad of online shopping and other tasks, especially in a context in which some portion—but not all—of the data contained in a Webpage 22 is to be modified before it is rendered and displayed for view by the requesting user 11.

Figure 3:
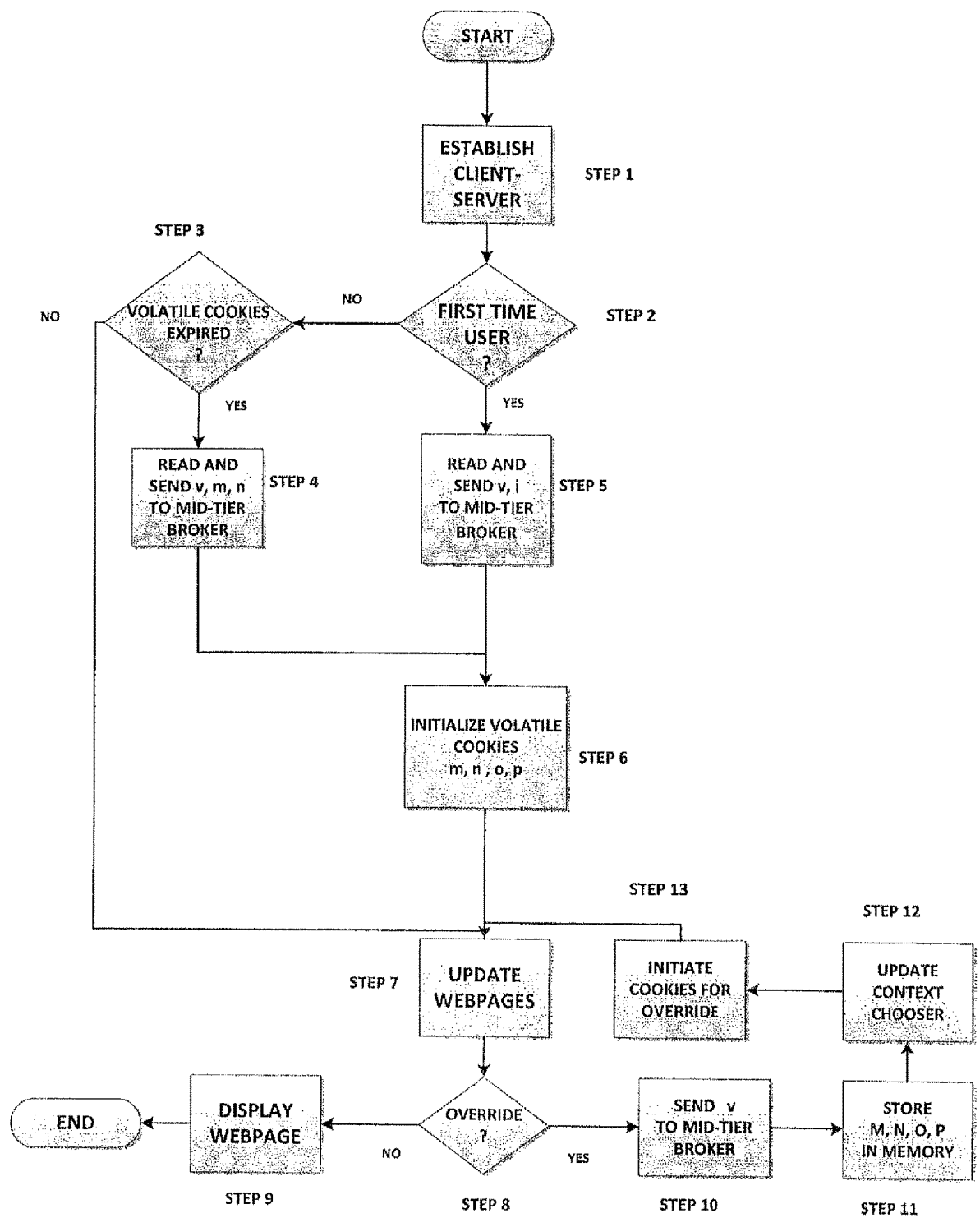
FIG. 3 shows an embodiment of a flow chart depicting a method of transforming pricing and product information portions of a deliverable Webpage originating from a first geographical area to pricing and product information for a second geographical area in accordance with the present invention.

In FIG. 3 there is shown a flow chart of an illustrative embodiment of such a method. Initially, a user 11 may begin an online shopping event by navigating to a particular Website 21 run or operated by a particular vendor server 20 (START). Typically, each Website 21 may be in communication with a database containing a vendor catalog 23 having a plurality of deliverable Webpages 22. In manners that are well known to the art, a request(s) for a discrete Webpage(s) 22 may be transmitted via a communication network 30 to the vendor server 20 and the vendor's Website 21 using the client-side processing device 16, e.g., using a Web browser 15. Requested Webpages 22 may, in turn, be transmitted to the Web browser 15 of the client-side processing device 16 via a communication network 30, For the purpose of this discussion, it may be assumed that the vendor server 20 is located in a first geographical area and the user 11 and her client-side processing device 16 are located in a second geographical area, remote from the first geographical area and, moreover, having its own commercial rules and practices. Furthermore, it may be assumed that the vendor 26 has created deliverable Webpages 22 as, for example, as HTML, leaving, however, certain portions of the deliverable Webpage 22, e.g., portions containing pricing and product information, in a universal or substantially universal coding that differs from the primary coding (HTML) and that is not a Website-specific coding, e.g., Javascript or images. For the context described herein, the portions of the Webpage 22 containing non-HTML-coded, universal or substantially universal coding are designed primarily to contain, when rendered and displayed, domestic pricing and product information and/or commercial rules and practices of a desired geographical area.

Once the processing device 16 has established communication with a desired vendor server 20, i.e., a client-server relationship (STEP 1), in a manner well known to the art, requested Webpages 22 may be delivered to the user 11, e.g., as, HTML, Javascript, images, and so forth, for display on the user's display device 17. However, according to the present invention, as part of the client-server relationship (STEP 1) and/or upon receipt of delivered Webpage 22 images from the vendor server 20, the client-side processing system 10, e.g., the Web browser 15, may be further adapted to execute an application to render and update the delivered Webpages 22 before they are displayed. The application may be contained, for example, in the data storage 12, in memory 13, and the like.

At the outset, how requested Webpages 22 are received, rendered, and displayed may depend on the user's status as: a first-time user or as a repeat user (STEP 2). For example, if the user 11 has previously visited the Website 21 and/or previously received Webpages 22 from the same vendor server 20, then, once the Web browser 15 receives the requested Webpage 22 and discovers amidst the, for example, HTML or images universal or substantially universal coding that is not in a Website-specific format, the discovery triggers a sub-process that enables rendering and updating the delivered Webpages 22 before they are displayed. For example, once the Web browser 15 identifies the universal or substantially universal coding, the Web browser 15 may be configured to initialize the intelligent agent 19 of the processing device 16. Once initialized, the intelligent agent 19 may execute an application that automatically searches one or more of the user's memory 13 in search for an unexpired, volatile cookie(s) (STEP 3) for the Website 21 or Webpage 22.

If volatile cookies that have not expired are found in memory 13, the intelligent agent 19 of the processing device 16 may simply use the volatile cookies and any existing static cookies in one or more of the user's memory 13 to update the Webpage 22 (STEP 7) before displaying the Webpages 22 on the user's display device 17 (STEP 9). For this embodiment and the present use, rendering and updating the Webpage 22 (STEP 7) may include replacing pricing and product information to include non-domestic information.

If, on the other hand, the volatile cookies have expired, then the intelligent agent 19 may search for any static cookies that may be stored in memory 13 (STEP 4). The intelligent agent 19 may then cause these data to be transmitted to the transformation platform 40 (STEP 4), where the mid-tier broker 49 may use static cookie data to search a data storage device 42 for additional information. Search parameters may include the identification of the merchant, the user's shipping address, and the user's preferred or default currency. The mid-tier broker 49 may then return the additional information to the intelligent agent 19, which will initialize new volatile cookies (STEP 6). More particularly, the intelligent agent 19 may use the initialized volatile cookies in rendering and updating Webpages 22 (STEP 7) displayed on the user's display device 17 (STEP 9). For this embodiment and the present use, rendering and updating the Webpage 22 (STEP 7) may include converting pricing to the user's geographical area and applying any other local or regional rules or conventions to the transaction-related portion of the Webpage 22 image.

If the user 11 is a first-time user, then the device 16 has neither volatile nor static cookies in memory 13. Accordingly, the intelligent agent 19 may be adapted to transmit certain search parameters, e.g., the processing device's IP address and the merchant identification information, to the mid-tier broker 49 (STEP 5) of the transformation platform 40. Using the search parameters, the mid-tier broker 49 may then process, for example, the IP address and merchant identification information through data storage 42 and/or the intelligent services device 44 before responding back to the processing device 16. Once the mid-tier broker 49 responds to the processing device 16 with search data from the data storage 42 and/or intelligent services device 44, the intelligent agent 19 may initialize volatile and static cookies (STEP 6) using the search data. The intelligent agent 19 may use the volatile and static cookies in rendering and updating Webpage 22 (STEP 7) before they are displayed on the user's display device 17 (STEP 9). For this embodiment and the present use, rendering and updating (STEP 7) may include converting pricing to the user's geographical area and applying any other local or regional rules or conventions to the transaction-related portion of the Webpage 22 image.

More specifically, according to the present method, while or as the requested Webpages 22 are being delivered to the user's processing device 16, and once the Web browser 15 has identified non-Website-specific coding in the Website (HTML) image, the intelligent agent 19 may be adapted to generate a request to the processing device 49 of the mid-tier broker platform 40. Depending on the user's status, the request may include a message containing one or more of the following search parameters/data: merchant identification (V), user's IP address (I), user's shipping destination (M), and user's preferred or default currency (N), where V is a set of all possible merchants/vendors 26, e.g., V={{vi}, {v2}, etc.}; I is a set of all possible IP addresses associated with a discrete user 11, e.g., I={{ii}, {i2}, etc.}; M is a set of all possible countries to which delivery from the vendor 26 is possible, e.g., M={{m1}, {m2}, etc.}; and N is a set of all currencies that the user 11 may use to make payment, e.g., N={{n1}, {n2}, etc.}.

For repeat or non-first time users whose volatile cookies have expired, the intelligent agent 19 may read data contained in static cookies, e.g., in memory 13, and may transmit the one or more of the following search parameters/data taken from the static cookies (STEP 4): specific merchant identification information (v), the user's default shipping destination (m), and the user's default currency (n). In response to this input, the processing device 49 may submit a request to the intelligent services device 44 and/or the data storage device 42. The processing device 49 and/or intelligent services device 44 may generate an API ("application programming interface") call to generate a response, e.g., using an XML file payload, to the intelligent agent 19. Optionally, the processing device 49 may deliver the XML file payload to the intelligent agent 19 as, for example, a JSON file. The response is adapted to initialize volatile cookies (STEP 6) in the user's memory 13. These (JSON file) data may be used for rendering and updating the Webpage 22 (STEP 7) prior to its display on the display device 17 (STEP 9). In this instance, rendering and updating (STEP 7) may include providing data necessary for transforming pricing and product information contained in or on the delivered Webpage 22, which was sent from a first geographical area, into pricing and product information for a second geographical area.

For example, the data parameters that may be used in rendering and updating (STEP 7) the Webpage 22 before display (STEP 9) may include one or more of: the default destination (m) for the user 11, the default currency (n) for the user 11, an exchange rate (o) between the user's default currency and the vendor's default currency, and pricing customization rules (p) for the user's default destination. Mathematically, for an input (B) where B={{v}, {m}, {n}}, the transformation function (g) maps to an output (X) where X={{m}, {n}, {o}, {p}}.

For users who are repeat users and whose volatile cookies have not expired, the data for rendering and updating the Webpage 22 (STEP 7) before display (STEP 9) still remain in the memory 13 of the processing device 16. Hence, the intelligent agent 19 does not need to request them from the mid-tier broker 49 and it may immediately undertake rendering and updating the Webpage 22 (STEP 7) before display (STEP 9). For this embodiment, rendering and updating (STEP 7) may include converting pricing and other information portions of the Webpage 22 to the user's geographical area and applying any other local or regional rules or conventions to the transaction-related portion of the Webpage 22 image.

For first-time users, the intelligent agent 19 may send a request to the mid-tier broker 49 of the transformation platform 40 (STEP 5). The request may include one or more of the following search parameters/data: specific merchant identification (v) and user's IP address (i). In turn, the processing device 49 of the mid-tier broker platform 40 may submit a request to intelligent services 44 and data storage 42. The processing device 49 and/or intelligent services device 44 may generate an API ("application programming interface") call to generate a response, e.g., an XML file payload, using as input, for example, the specific merchant identification (v) and user's IP address (i) to generate a response. Optionally, the processing device 49 may deliver the XML file payload to the intelligent agent 19 as, for example, a JSON file. The response is adapted to initialize volatile and static cookies (STEP 6) that may be stored in any of the user's memory 13. The response may further include (JSON file) data for rendering and updating the Webpage 22 (STEP 7) prior to its display on the display device 17 (STEP 9). In this instance, rendering and updating (STEP 7) may include providing data necessary for transforming pricing and product information contained in or on the delivered Webpage 22, which was sent from a first geographical area, into pricing and product information for a second geographical area.

For example, for first-time users, the response to the user 11 may include one or more of: the default destination (m) for the user 11, the default currency (n) for the user 11, an exchange rate (o) between the user's default currency and the vendor's default currency, and a pricing customization rules (p) for the user's default destination. Mathematically, for an input (A) where A={{v}, {i}} the transformation function (f) maps to an output (X) where X={{m}, {n}, {o}, {p}}.

Figure 2B:
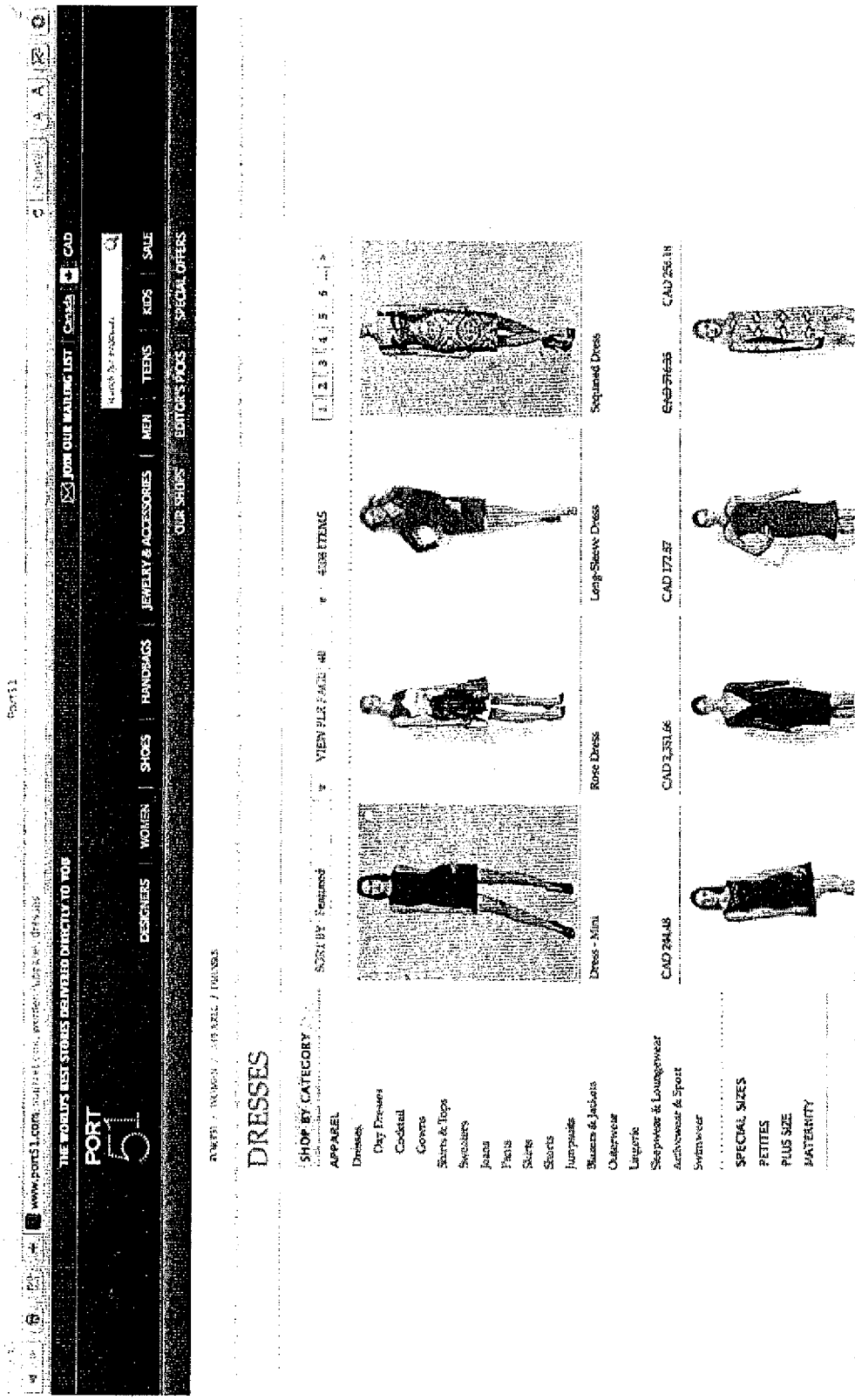

Using, inter alia, computer-executable instructions, user preference data, default shipping destination data, and/or global positional information about the user 11 that are contained in memory, i.e., a client-side library 13, the intelligent agent 19 renders and updates (STEP 7) the delivered Webpage 22 before it is displayed on the user's display device 17 (STEP 9). More particularly, the intelligent agent 19, using data stored in volatile and/or static cookies stored in the memory 13, may be adapted to interact with the Webpage 22—and, more particularly, with certain discrete portions of the Webpage 22—transform any "domestic" information portions in the Webpage 22 into "non-domestic" information portions, further rendering and delivering the transformation for display on the display device (STEP 9). For example, as show in FIGS. 2A and 2B, a U.S.-based vendor likely would include pricing information having a default billing currency in U.S. dollars (FIG. 2A) while a Canadian user 11 may prefer the billing currency in Canadian dollars. In this case, in the displayed Webpage 22, the "domestic" U.S. dollars (FIG. 2A) would be displayed as "non-domestic" Canadian dollars (FIG. 2B). It goes without saying that the rendering of data would include a currency exchange based on current, real-time currency exchange rates, which data may be found in the intelligent services device 44 of the transformation platform 40.

Once the preferred shipping destination and default "non-domestic" currency have been established, other data found in the intelligent services device 44 of the transformation platform 40 may include country-specific price markups and/or price discounts and/or may include any other special regional marketing messages or offers depending on the preferred shipping destination of the products. An example of the latter may be free shipping to Australia.

Figure 4:
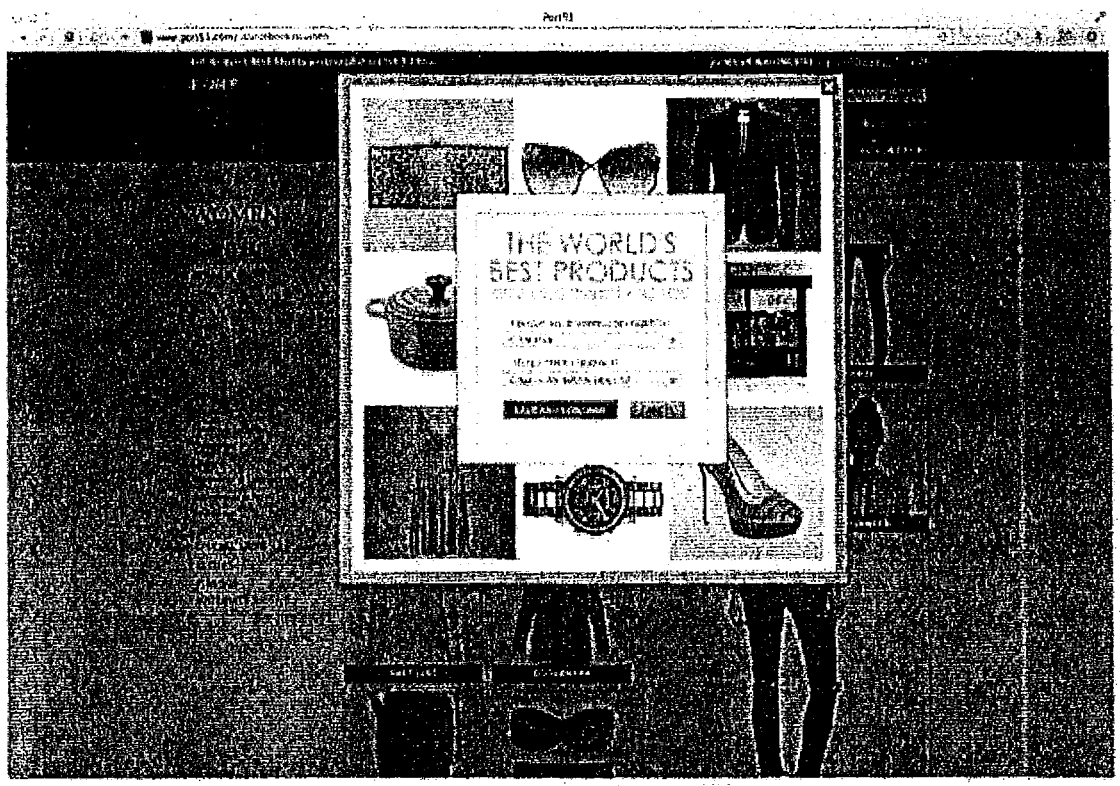
FIG. 4 shows an illustrative embodiment of a context chooser in accordance with the present invention.

Optionally, once the Webpages 22 have been rendered and updated (STEP 7), users 11 may override the default destination and/or the default "non-domestic" currency (STEP 8). This override option (STEP 8) may be exercised after being prompted, e.g., by the processing device 16, or the user 11 may actively override one or both of the defaults, e.g., using the context chooser 14 feature. In one variation of this embodiment, users 11 may override one or more of the defaults by selecting a desired billing currency and/or a preferred shipping destination from a list, drop-down menu, and the like. The context chooser 14 may be hardware, software, firmware or a combination of the three. Referring to FIG. 4, there is shown an illustrative embodiment of a screen display for a context chooser 14 with which users 11 may choose a preferred shipping destination and a preferred billing currency. For example, if a Canadian user 11 would prefer delivery to a third geographical location, e.g., Australia, the Canadian user 11 may opt to override the default shipping destination, substituting the preferred shipping destination.

For a user override, the intelligent agent 19 may be adapted to generate a request to the processing device 49 of the transformation platform 40. The request may include a message containing, for example, the merchant identification (v) (STEP 10). The processing device 49 or intelligent services device 44 may generate an API ("application programming interface") call using the specific merchant identification (v) to generate a response, e.g., an XML file payload, to the user 11 that may include the manual selection options. The manual selection options may include, for example, one or more of the following: the set of all possible shipping destinations (M), the set of all possible exchange currencies (N), the set of all possible currency exchange rates (O), the set of all pricing customization rules (P), and so forth from which the user 11 may select as part of the override function. Mathematically, for an input (C) where C={v} the transformation function (h) maps to an output (Y) where Y={M, N, O, P}.

The manual selection options may be stored, e.g., as a volatile or a static cookie(s), in the client-side library 13 (STEP 11). The intelligent agent 19 may also update the content chooser 14 with any new manual selection options (STEP 12). Once the user 11 has been presented with a context chooser 14, i.e., as a displayed image on the user's display device 17, the user 11 may override the default currency and default shipping destination. The user's selections may initialize one or more of the static cookies stored in the client-side library 13 (STEP 13), which data may be used to render and update the Webpages 22 (STEP 7) before the Webpages 22 are displayed (STEP 9) on the user's display device 17.

While the above description has focused primarily upon transforming "domestic" portions of pricing and product information into "non-domestic" portions, in other embodiments, the method may further augment the pricing and products information that have been transformed. For example, such augmentation may include, for the purposes of illustration and not limitation, providing, on a per item basis and/or on a total order basis: shipping and handling costs; shipping duties and costs at both ends of the transaction; local taxes, import taxes, export taxes, and value added taxes; the application of free shipping to certain geographical areas but not to other geographical areas; the application of price mark-ups or discounts to discrete, pre-defined geographical areas; application of an export restriction of a particular item(s) to a discrete, pre-defined geographical area; application of an import restriction of a particular item(s) into a certain, pre-defined geographical area; application of commercial rules; and application of a host of other restrictions that may be based on any of: a weight of an item(s), a value of an item(s), licensing required for an item(s), the hazardous materials (HAZMAT) status of an item(s), Department of Agriculture or Department of Fish & Wildlife policies towards an item(s), endangered species acts as applied to an item(s), and so forth.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

What is claimed is:

1. A system for transforming information relevant to a first geographical location provided in a webpage into information relevant to a second geographical location, the system comprising:
    a processing device for executing computer-executable instructions;
    a memory for storing information;
    a user browser that is adapted to enable a user to search for webpages from a vendor server that provides products and pricing information about products offered by a vendor, the user browser further adapted to detect additional coding incorporated into a webpage that identifies information in the webpage relevant to the first geographical location that requires transformation if the webpage is rendered in a geographical location other than the first geographical location;
    an intelligent agent that is initialized by the processing device in response to the user browser detecting the additional coding, the intelligent agent being adapted to search the memory for one or more unexpired volatile cookies associated with the webpage, each of the one or more unexpired volatile cookies containing information related to the user's geographical location, and transform the information identified by the additional coding from information relevant to the first geographical location into information relevant to the user's geographical location based at least in part on the information contained in the one or more unexpired cookies;
    a mid-tier broker platform comprising a data storage device containing information relevant to a plurality of geographic locations, wherein if an unexpired volatile cookie is not found in the memory, the intelligent gent is further adapted to access via a network the mid-tier broker platform and the mid-tier broker platform is adapted to return to the intelligent agent information relevant to the user's geographical location, the intelligent agent further adapted to initialize a new volatile cookie that contains information related to the user's geographical location, and transform the information identified by the additional coding from information relevant to the first geographical location into information relevant to the user's geographical location based at least in part of the information contained in the new volatile cookie; and
    a display device for displaying the webpage having the information relevant to the user's geographical location.

2. The system of claim 1 further comprising a context chooser that is adapted to allow the user to manually override the updated information before it is displayed on the display device as information relevant to the second geographical location.

3. The system of claim 1 or 2, wherein the information relevant to the first geographical location is selected from the group consisting of a price in a default billing currency, a price in a preferred billing currency, local taxes, additional duties, value added taxes, export codes, classification under the Harmonized Commodity Description and Coding System, shipping costs, handling costs, shipping restrictions, import restrictions, export restrictions, licensing requirements, geographical-specific discounts, and geographical-specific mark-ups.

4. The system of claim 1, wherein the information relevant to a first geographical location includes a default shipping destination.

5. A method for a processing device to transform information relevant to a first geographical location provided in a webpage into information relevant to a second geographical location, the processing device including memory for storing Information, a user browser that is adapted to enable a user to search for webpages from a vendor server that provided products and pricing Information about products offered by a vendor, a display device, and an intelligent agent, the method comprising:
    receiving, by the user browser, a webpage from the vendor server, the webpage including information relevant to a first geographical location;
    detecting, by the user browser, additional coding incorporated into the webpage received from the vendor server, the additional coding identifying information in the webpage relevant to the first geographical location that requires transformation if the webpage is rendered in a geographical location other than the first geographical location;
    in response to detecting the additional coding, initializing, by the processing device, the intelligent agent;
    searching, using the intelligent agent, the memory for one or more unexpired volatile cookies associated with the webpage, each of the one or more volatile cookies containing information related to the user's geographical location;
    if an unexpired volatile cookies is found in the memory, transforming, by the intelligent agent, the information identified by the additional coding from information relevant to the first geographical location into information relevant to the user's geographical location based at least in part on the information contained in the found unexpired volatile cookie;
    if an unexpired volatile cookie is not found in the memory, accessing, via a network using the intelligent agent, a mid-tier broker platform having a database containing information relevant to a plurality of geographical locations;
    receiving, from the mid-tier broker platform, information related to the user's geographical location;

initializing, by the intelligent agent, a new volatile cookie that contains the information related to the user's geographical location; and transforming, by the intelligent agent, the information identified by the additional coding from information relevant to the first geographical location into information relevant to the user's geographical location based at least in part on the information contained in the new volatile cookie; and displaying on the display device the webpage having the information relevant to the user's geographical location.

6. The method of claim 5, wherein the information relevant to the first geographical location and the information relevant to the user's geographical location are selected from the group consisting of a price in a default billing currency, a price in a preferred billing currency, local taxes, additional duties, value added taxes, export codes, classification under the Harmonized Commodity Description and Coding System, shipping costs, handling costs, shipping restrictions, import restrictions, export restrictions, licensing requirements, geographical-specific discounts, and geographical-specific mark-ups.

7. The method of claim 5 further comprising enabling the user to override displaying the information relevant to the second geographical location.

* * * * *